United States Patent
Stumbo

(10) Patent No.: US 11,713,813 B2
(45) Date of Patent: Aug. 1, 2023

(54) INLINE VARIABLE SONIC VALVE

(71) Applicant: Steven Charles Stumbo, Severance, CO (US)

(72) Inventor: Steven Charles Stumbo, Severance, CO (US)

(73) Assignee: WOODWARD, INC., Fort Collins, CO (US)

(*) Notice: Subject to any disclaimer, the term of this patent is extended or adjusted under 35 U.S.C. 154(b) by 0 days.

(21) Appl. No.: 17/567,490

(22) Filed: Jan. 3, 2022

(65) Prior Publication Data

US 2023/0213099 A1 Jul. 6, 2023

(51) Int. Cl.
- *F16K 1/38* (2006.01)
- *F16K 1/52* (2006.01)
- *F16K 47/00* (2006.01)
- *F16K 31/54* (2006.01)
- *F16K 31/12* (2006.01)

(52) U.S. Cl.
CPC .................. *F16K 1/38* (2013.01); *F16K 1/52* (2013.01); *F16K 47/00* (2013.01)

(58) Field of Classification Search
CPC .............. F16K 1/38; F16K 1/52; F16K 47/00; F16K 31/1221; F16K 31/54; F16K 1/123–126

See application file for complete search history.

(56) References Cited

U.S. PATENT DOCUMENTS

| | | | | |
|---|---|---|---|---|
| 2,133,983 A | * | 10/1938 | Gaston | F16K 1/12 137/219 |
| 2,996,074 A | * | 8/1961 | Page | F16K 1/126 137/220 |
| 3,311,342 A | | 3/1967 | Bering | |

(Continued)

FOREIGN PATENT DOCUMENTS

| | | | | |
|---|---|---|---|---|
| CA | 2550524 A1 | * | 12/2006 | F16K 1/123 |
| CN | 107084248 A | * | 8/2017 | |

(Continued)

OTHER PUBLICATIONS

"Electric SonicFlo™ Gas Valves (Product Specification)," *Woodward, Inc.*, 2008, 4 pages. URL:https//www.pmcontrol.com.au/attachments/PMControl/products/47/Electric%20SonicFlo.pdf.

(Continued)

*Primary Examiner* — Marina A Tietjen
(74) *Attorney, Agent, or Firm* — Reinhart Boerner Van Deuren P.C.

(57) ABSTRACT

An inline variable sonic valve is provided that includes a housing defining an inlet and an outlet positioned inline along a gas flow axis. A contoured metering plug is fixed within the housing and a diverging sleeve is movably positioned within the housing downstream of the contoured metering plug. An actuator is positioned offline from the gas flow axis and is configured to move the diverging sleeve within the housing relative to the contoured metering plug fixed therein to vary a gas metering area defined between the (Continued)

contoured metering plug and the diverging sleeve. The actuator may be hydraulic, fueldraulic, pneumatic, or electric, and may drive the diverging sleeve discretely to an open or a closed position, or to a variable position between the open and closed position when a position senor is included to meter the flow therethrough.

20 Claims, 5 Drawing Sheets

(56) References Cited

U.S. PATENT DOCUMENTS

| | | | |
|---|---|---|---|
| 3,784,156 A | 1/1974 | Paetzel et al. | |
| 4,110,416 A | 8/1978 | Sarto | |
| 4,117,859 A * | 10/1978 | Illy | F16K 1/123 137/219 |
| 4,137,933 A * | 2/1979 | Culpepper | F16K 1/123 137/219 |
| 4,617,796 A | 10/1986 | Knapp et al. | |
| 4,728,075 A | 3/1988 | Paradis | |
| 4,825,895 A | 5/1989 | Maltman | |
| 6,783,108 B2 | 8/2004 | Jansen | |
| 6,802,488 B1 * | 10/2004 | Patterson | F16K 1/123 251/267 |
| 7,044,434 B2 | 5/2006 | Brinks et al. | |
| 8,689,883 B2 | 4/2014 | Kim | |
| 9,611,718 B1 | 4/2017 | Bond et al. | |
| 9,644,755 B2 | 5/2017 | Davies | |
| 10,544,879 B2 | 1/2020 | Denton | |
| 2004/0035462 A1 * | 2/2004 | McCarty | F16K 1/123 137/219 |
| 2004/0183044 A1 * | 9/2004 | Wears | F16K 47/04 251/344 |
| 2005/0199840 A1 | 9/2005 | Brinks et al. | |
| 2007/0144595 A1 * | 6/2007 | Geva | F16K 1/126 137/625.48 |
| 2011/0193001 A1 * | 8/2011 | Farner | F16K 31/406 251/324 |
| 2016/0091110 A1 * | 3/2016 | Schade | F16K 1/123 251/250 |
| 2016/0139608 A1 | 5/2016 | Eickhoff | |
| 2017/0082035 A1 | 3/2017 | Geiger | |
| 2020/0263798 A1 * | 8/2020 | Volz | F16K 31/0655 |

FOREIGN PATENT DOCUMENTS

| | | | |
|---|---|---|---|
| DE | 10051492 A1 * | 4/2002 | F16K 1/123 |
| DE | 202017103004 U1 * | 8/2017 | |
| EP | 566543 A1 * | 10/1993 | F16K 1/123 |
| EP | 0872675 A1 * | 10/1998 | |
| EP | 1574764 A2 | 9/2005 | |
| FR | 2802604 A1 * | 6/2001 | F16K 1/123 |
| GB | 806210 A | 12/1958 | |
| WO | WO-9427069 A1 * | 11/1994 | F16K 1/123 |

OTHER PUBLICATIONS

"SonicFlo™ Gas Valves Hydraulically Actuated (Product Specification)," *Woodward, Inc.*, 2010, 4 pages. URL:http://www.pmcontrol.co.id/attachments/PMControl/products/47/SonicFlo%20Gas%20Valves.pdf.

Decastro et al., "A Modular Aero-Propulsion System Simulation of a Large Commercial Aircraft Engine" (Technical Memorandum), *National Aeronautics and Space Administration*, Sep. 1, 2008, 24 pages. URL:https://ntrs.nasa.gov/citations/20080043619.

Garg, "Aircraft Turbine Engine Control Research at NASA Glenn Research Center" (Technical Memorandum), *National Aeronautics and Space Administration*, Apr. 1, 2013, 36 pages. URL:https://ntrs.nasa.gov/citations/20130013439.

* cited by examiner

INLINE VARIABLE SONIC VALVE

FIELD OF THE INVENTION

This invention generally relates to gas valves, and more particularly to sonic gas valves.

BACKGROUND OF THE INVENTION

Accurate control of mass flow rates is a requirement in many industries. For example, in the process industry, gas flow is controlled. In the gas turbine industry, mass flow rate is used to meter fuel into gas turbines. Mass flow is determined from the equation $\dot{m}=\rho VA$ where $\dot{m}$ is the mass flow rate, $\rho$ is the gas density, V is the velocity of the gas, and A is the cross-sectional area where the gas is flowing.

Upstream pressure and temperature measurements are used to derive the gas density. To measure the velocity in subsonic valves, downstream pressure is also measured, and velocity is derived based on the pressure differential of the upstream and downstream pressures. However, the downstream pressure measurement reduces the accuracy and reliability of the flow control due to the use of both upstream and downstream sensors.

As a result of the reduced accuracy and reliability, the industry developed sonic gas valves where the velocity in the throat (narrowest section) of the nozzle of the valve is Mach 1.0. When the gas velocity is Mach 1.0 in the throat, downstream pressure signals cannot propagate upstream through the nozzle throat because pressure signals cannot travel faster than the speed of sound. One result of this fact is that the upstream flow into the nozzle is not affected by downstream pressure when the velocity in the nozzle throat is Mach 1.0. Hence, even when the downstream pressure is lowered, the velocity in the nozzle throat is not affected. As a result, downstream pressure measurements no longer are required to determine velocity.

In recognition of this, the assignee of the instant application invented a gas valve design that achieves sonic flow at lower pressure ratios (P1/P2) in variable area critical (sonic) venturi designs than in conventional designs. Such sonic valve is described in U.S. Pat. No. 7,044,434 B2 to Brinks et al. entitled High Recovery Sonic Gas Valve, the teachings and disclosure of which are hereby incorporated in their entireties by reference thereto.

That valve design provides a curved flow path for the inlet passage to force inlet flow into the nozzle area in a more uniform manner causing a highly similar flow condition at each point around the circumference of the nozzle flow area annulus. Such high recovery sonic gas valve also includes a converging contoured restriction located upstream of the nozzle throat to straighten the flow. The converging contoured restriction is shaped such that the area gradient starts at nearly zero (e.g., slightly negative) and becomes increasingly negative closer to the nozzle throat. Further, the diffuser downstream of the nozzle is shaped such that the area gradient starts out as a small positive value and increases up to a maximum value and then drops off at the outlet of the diffuser where the flow path is nearly cylindrical in shape.

This high recovery sonic gas valve joined a standard and medium sonic flow gas valve to form the SonicFlo™ product line for Industrial Turbine Applications. Indeed, such SonicFlo™ products provide sonic nozzle designs that improve accuracy for fuel metering and reduced valve sizes at low pressure drop conditions by extending the choked flow point (critical pressure ratio) from approximately 0.52 to pressure ratios of 0.926 (P2/P1) and higher. In addition, the increased pressure ratio sonic condition allows for customers to run engines at full power operating conditions without the need to increase the inlet pressure of the supply fuel gas.

One disadvantage of the current SonicFlo™ product line is the need for utilizing a 90-degree valve design. Currently, this is used to facilitate the linear metering plug movement that provides the variable metered area. The electric SonicFlo™ assemblies combine plug-style metering valves with electric motor driven leadscrew actuators, while the hydraulically actuated SonicFlo™ assemblies utilize an integral hydraulic actuator having a single-acting spring-loaded design for failsafe operation. The servovalve is electrically redundant with triple coil design, and position feedback for the actuator is provided by either a dual or triple coil LVDT (linear variable differential transformer) directly coupled to the hydraulic piston.

Another disadvantages of using the 90-degree valve design is that it has a non-idealized flow path for some applications. Turning the flow 90 degrees may not be ideal based on the application and it can create a loss of efficiency that can impact the maximum attainable recovery (critical pressure ratio). Further, the 90-degree SonicFlo™ body designs can be larger in weight and size than typical valves of the same metering area. Despite all of the advantages provided thereby, the weight and size can impact the use of this type of valve technology for certain applications, e.g., aircraft applications, where weight and envelope are critical.

In view of the above, there is a need in the art for a sonic gas valve that achieves the benefits of the current SonicFlo™ products without the above noted disadvantages that may be limiting their use in certain applications. Embodiments of the present invention provides such a sonic flow gas valve. These and other advantages of the invention, as well as additional inventive features, will be apparent from the description of the invention provided herein.

BRIEF SUMMARY OF THE INVENTION

In one aspect, embodiments of the invention provide new and improved sonic gas valves that overcome one of more of the problems existing in the art. In particular, embodiments of the present invention provide a new and improved sonic gas valve that improves the above limitations of the current, 90-degree design to allow utilization of such embodiments in even more applications. More particularly, embodiments of the invention provide new and improved inline sonic gas valves. Still more particularly, embodiments of the present invention utilizes movement of a diverging sleeve, instead of the plug as in the 90-degree design, to provide a more compact, integrated actuation design.

In another aspect, embodiments of the present invention provide new and improved sonic gas valves that offer additional advantages over the state of the art. In one embodiment, the inline design improves efficiency of the flow path and improves/increases the upper recovery limit. Computational Fluid Dynamics (CFD) results show a significant improvement in the critical pressure ratio for embodiments of the inline (straight thru) sonic valves as compared to 90-degree sonic valves.

In yet another aspect, embodiments of the present invention utilizing the inline design decrease the weight and size of the current SonicFlo™ designs for a given metering flow area size. As such, embodiments of the present invention may be used in Aircraft Turbine Applications. Such embodiments utilizing the inline design in Aircraft Applications improve the advertised metering flow accuracy by eliminating the dependence upon the downstream pressure measurement for effective area calculations. Other embodiments of the present invention utilizing the inline design may be used in Industrial applications.

In a further aspect, embodiments of the present invention utilizing the inline design are smaller and simpler than current SonicFlo™ valves and allow for use of a wider range of materials and manufacturing processes, i.e., Inconel, additive manufacturing, etc. Certain embodiments provide on/off as well as modulating flow control for different applications.

In a still further aspect, embodiments of the present invention utilizing the inline design are actuated by a number of different actuators, including hydraulics, fueldraulics, pneumatics, and electrical/mechanical actuation (e.g., utilizing a roller screw methodology). Certain embodiments incorporate feedback transducers for closed loop position control. Some embodiments for hydraulic and fueldraulic applications also incorporate integrated servo valves. Embodiments of the present invention also provide improved reliability by reducing the number of parts currently utilized in butterfly valve designs used for low temperature, aircraft applications.

In one embodiment an inline variable sonic valve is provided that includes a housing defining an inlet and an outlet positioned inline along a gas flow axis. A contoured metering plug is fixed within the housing and a diverging sleeve is movably positioned within the housing downstream of the contoured metering plug. An actuator is positioned offline from the gas flow axis and is configured to move the diverging sleeve within the housing relative to the contoured metering plug fixed therein to vary a gas metering area defined between the contoured metering plug and the diverging sleeve.

In an embodiment the housing includes an inlet housing and an outlet housing joined therewith. Preferably, the inlet housing includes a number of metering plug support vanes that are configured to hold the contoured metering plug in a fixed position within the inlet housing. In one embodiment, the metering plug support vanes are integrated with an inlet cone that is configured to receive the contoured metering plug. Preferably, the inlet cone is configured to threadably receive the contoured metering plug. In such an embodiment, the contoured metering plug defines a tool boss in an end thereof to facilitate threading into the inlet cone.

In an embodiment, the actuator is configured to move the diverging sleeve relative to the contoured metering plug to vary a gas metering area between a fully closed position wherein the contoured metering plug and the diverging sleeve are in sealing contact to prevent any gas flow therebetween, and a fully opened positioned wherein the contoured metering plug and the diverging sleeve are spaced apart to allow gas flow therebetween. In embodiments wherein the actuator is a poppet-style actuator, the actuator positions the diverging sleeve in one of the fully closed position or the fully opened position discretely.

In an embodiment, the actuator includes a first fitting fluidly coupled to a first actuation control volume and a second fitting fluidly coupled to a second actuation control volume. The two actuation control volumes are each defined between the housing and an outer periphery of the diverging sleeve, and are separated by a control volume divider protrusion extending from the diverging sleeve. In such embodiment, a differential pressure between the first actuation control volume and the second actuation control volume results in movement of the diverging sleeve within the housing. In different embodiments, the first fitting and the second fitting are hydraulic fittings, fueldraulic fittings, or pneumatic fittings. In an embodiment, the diverging sleeve includes a port that fluidly couples an inlet flow pressure to a downstream side of the control volume divider protrusion in order to offset influence of the inlet flow pressure on the diverging sleeve. This enables a reduction of the actuation differential pressure.

In another embodiment, the actuator includes a position sensor configured to determine a position of the diverging sleeve within the housing. In such embodiments, the actuator is configured to position the diverging sleeve in a selected position between the fully closed position and the fully opened position to vary the gas flow. In an embodiment the position sensor is a linear variable differential transformer. In certain embodiments, the actuator includes a failsafe spring that is configured to return the diverging sleeve to one of the fully closed position or the fully opened position.

In a further embodiment, the actuator is an electric motor drivably coupled to the diverging sleeve. In one embodiment, the electric motor drives roller or ball screw element that is threadably connected to threads on an exterior surface of the diverging sleeve to linearly translate the diverging sleeve within the housing. In an embodiment a rotary variable differential transformer (RDVT) is included to determine a position of the diverging sleeve within the housing. In a still further embodiment, the electric motor drives a pinion threadably connected to a rack positioned on an exterior surface of the diverging sleeve to linearly translate the diverging sleeve within the housing.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, there is illustrated a new and improved sonic gas valve that provides precise fuel control and shut-off capabilities for various applications, including large industrial gas turbines with single or multiple combustion manifold systems, aircraft turbine engines, etc. Indeed, while an exemplary operating environment will be described, such description should be taken by way of example and not by way of limitation as embodiments of the present invention may be used in a wide array of applications.

Indeed, as will become clear from the following description, embodiments of the sonic gas valve of the present invention controls the flow of gas fuel to the combustion system of an industrial, utility, aircraft, etc. gas turbine. The unique design yields a flow characteristic unaffected by discharge pressure up to a pressure ratio (P2/P1) of at least 0.80 for Standard Recovery and at least 0.91 for High Recovery, reducing the requirement for additional gas pressure boosting. The various embodiments of the sonic gas valves of the present invention integrate the valve and actuator into compact assembly providing idealized, inline, gas flow therethrough. This close integration allows for lower costs, smaller envelope and better accuracy.

The various embodiments of the sonic gas valve of the present invention may utilize various different technology actuators in a variety of different operating environments. Similarly, position feedback for the actuator may be provided by various mechanisms depending on the application and actuation topology. Rapid or emergency failsafe operation is also provided in various of the embodiments of the sonic gas valve to drive the actuator to its failsafe position.

Figure 1:
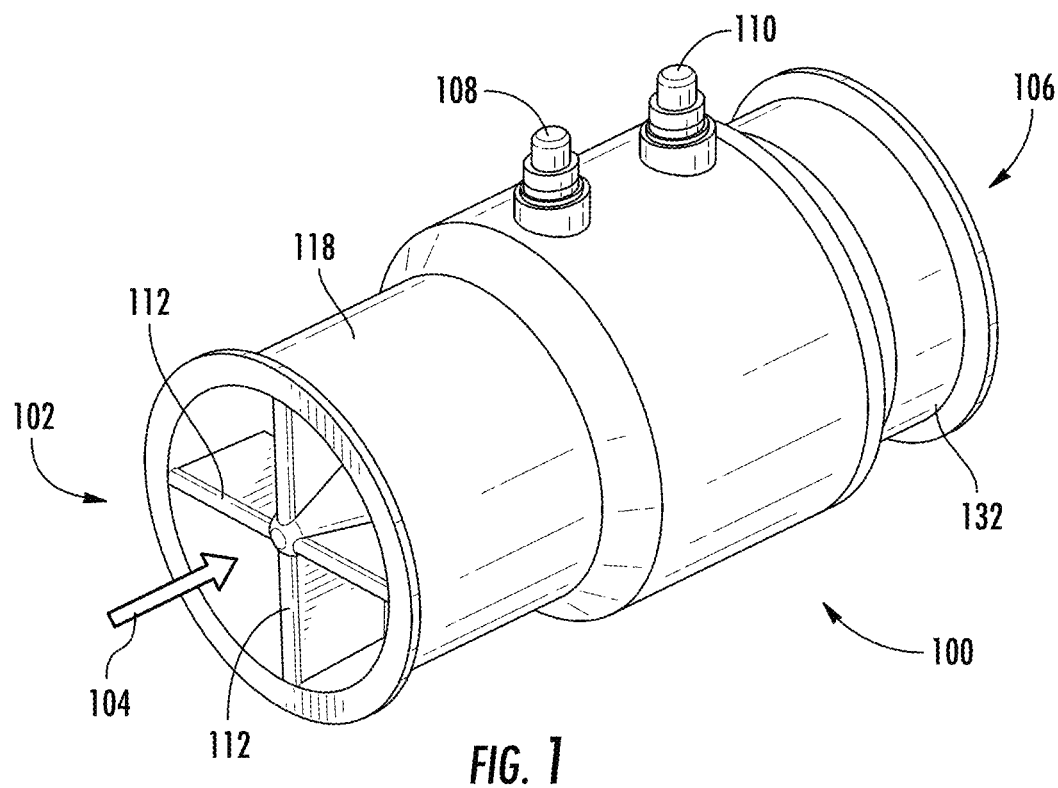
FIG. 1 is an isometric illustration of one embodiment of an inline sonic gas valve constructed in accordance with the teachings of the present invention.

Turning now specifically to FIG. 1, there is illustrated an embodiment of an inline sonic gas valve 100 that utilizes a simple "poppet" style actuation that provides for either a fully open state (as illustrated) or a fully closed state. In this embodiment when opened, gas fuel enters an inlet 102 in the direction of flow arrow 104, and is discharged via an outlet 106. As may be seen, the inlet 102 and the outlet 106 are inline with one another, therefore providing an optimized gas flow therethrough uninterrupted by an inline actuator of prior, 90-degree designs. Instead of utilizing an inline actuator to control the opening and closing of the valve, the actuation is enabled via fittings 108, 110, e.g., fueldraulic, hydraulic, pneumatic, etc. fittings, positioned on the side of valve 100, the operation of which will be described more fully below.

Figure 2:
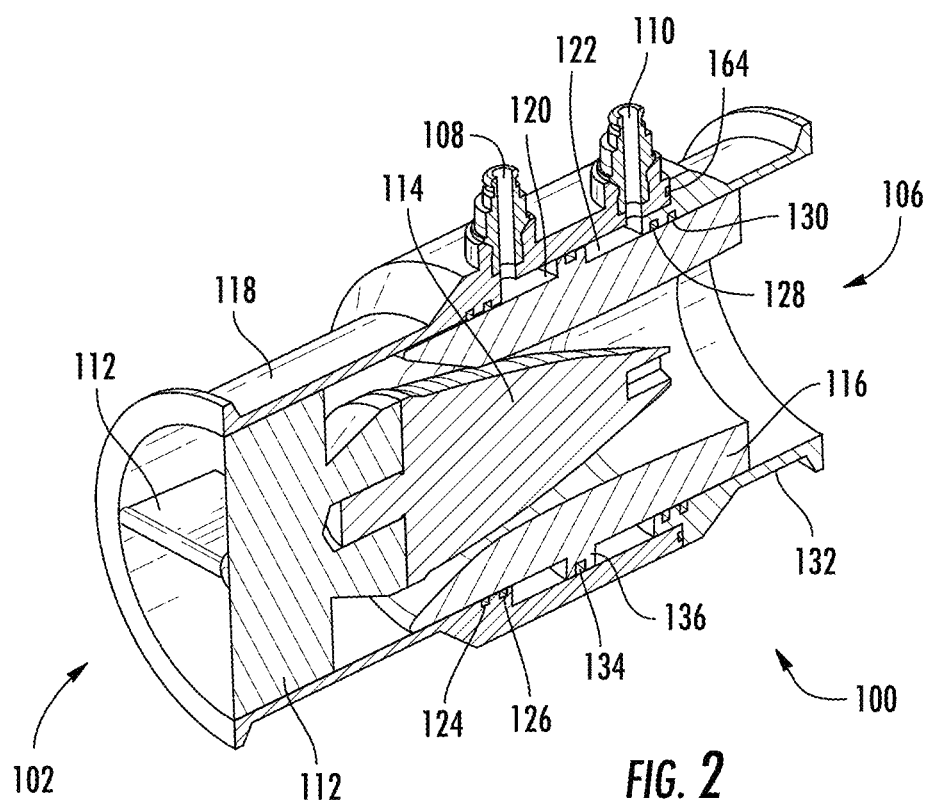
FIG. 2 is a cross-sectional view of the inline sonic gas valve of FIG. 1.

Internally, as illustrated in the cross-section of FIG. 2, the gas fuel flow enters the valve 100 on the inlet 102, past the metering plug support vanes 112 and the countered metering plug 114, through the movable diverging sleeve 116, and exits through the outlet 106. The plug support vanes 112 are a separate piece in some embodiments, and are fully integrated into the inlet housing 118 in other embodiments, either by casting or additive manufacturing. The outlet housing 132 and flange assembly as shown is threaded into the inlet housing 118, similar to a spanner, in one embodiment, and may be secured thereto in other embodiments by interference fit, spin weld, adhesive, etc. In the threaded embodiment shown in this FIG. 2, a seal 164 may be included between the inlet housing 118 and the outlet housing 132.

Unlike prior designs that controlled the position of the metering plug via an inline actuator (thus requiring the 90-degree flow design), embodiments of the present invention utilize a fixed metering plug 114 that is held in the inlet housing 118 by the integrated support vanes 112. In order to provide the sonic gas valve 100 metering in such embodiments, the position of the diverging sleeve 116 is controlled in order to create the variable metering area required.

In the embodiment of FIG. 2, a pneumatic, hydraulic, fueldraulic, pneumatic, etc. differential pressure is applied to the fittings 108, 110, typically via a servo valve (not shown), to the actuation control volumes 120, 122 formed between the housing 118 and the diverging sleeve. Such differential pressure within the actuation control volumes 120, 122 causes movement of the diverging sleeve 116 to meter the variable metering area between the fixed countered metering plug 114 and the diverging sleeve 116. Redundant seals 124, 126 on the inlet side of the inlet housing 118, and 128, 130 on the outlet side of the outlet housing 132 accommodate movement to the diverging sleeve 116, while seal 134 on the control volume divider protrusion 136 of the diverging sleeve 116 separates the two actuation control volumes 120, 122.

Figure 3:
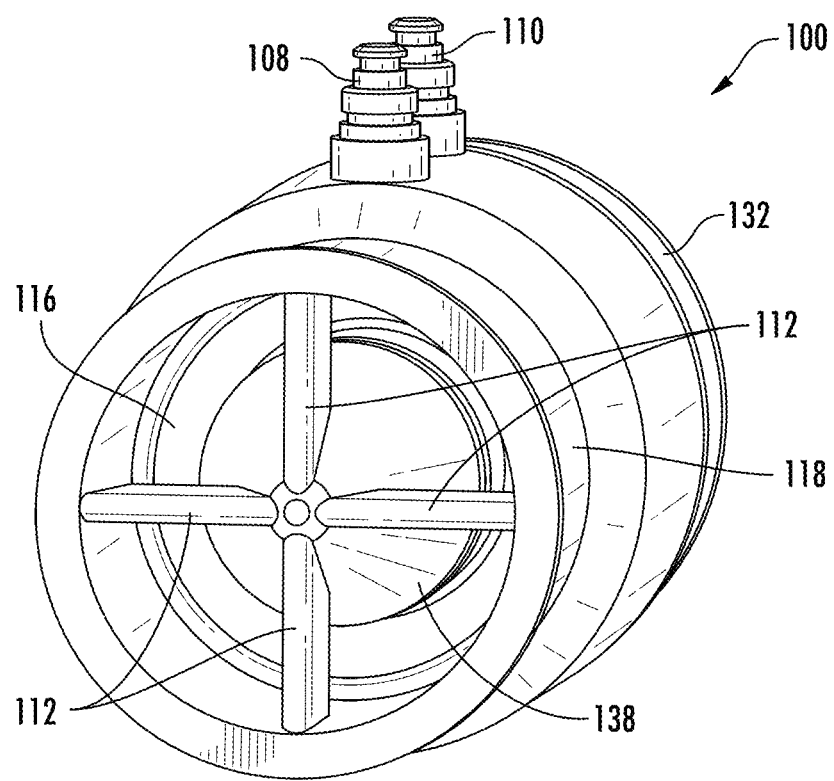
FIG. 3 is an inlet end view of the inline sonic gas valve of FIG. 1.
Figure 4:
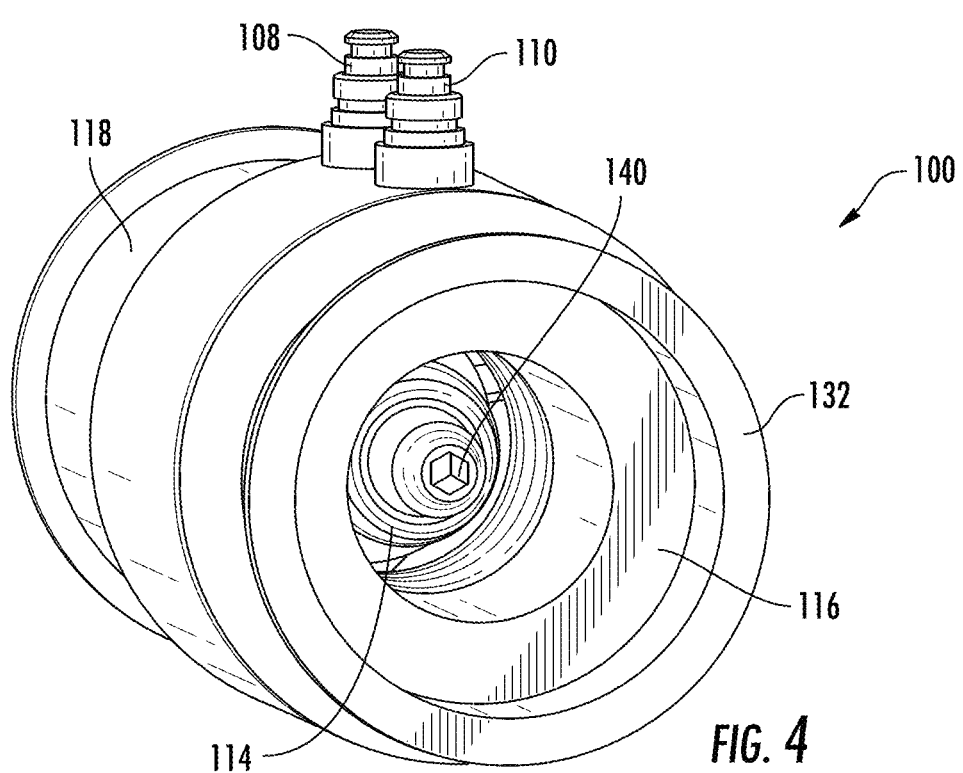
FIG. 4 is an outlet end view of the inline sonic gas valve of FIG. 1.
Figure 5:
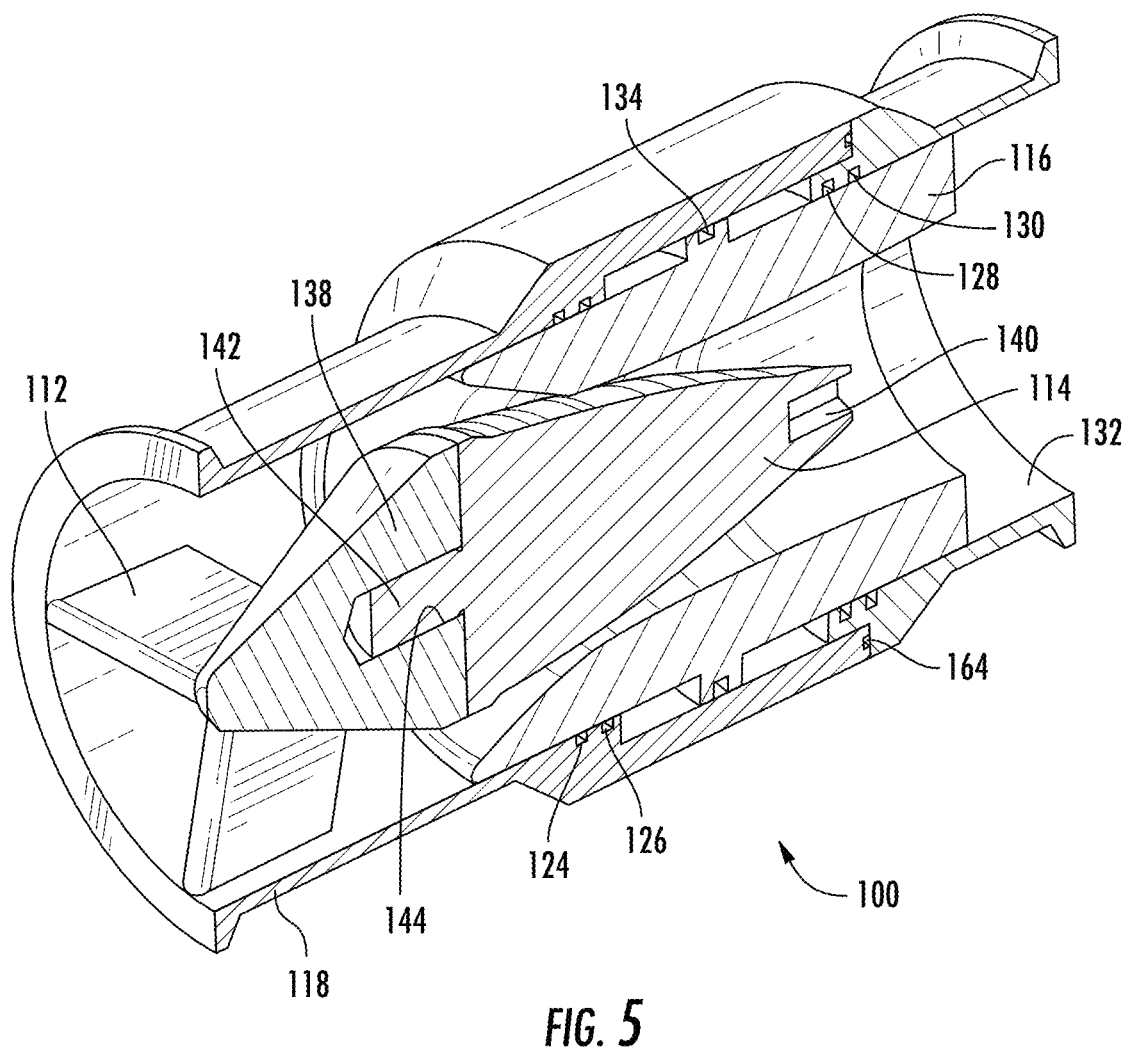
FIG. 5 is a cross-sectional view of the inline sonic gas valve of FIG. 1 taken at 45° from the inlet vanes.

As can be seen in the inlet end view of FIG. 3, the inlet housing 118 includes an inlet cone 138 integrate with or held by the metering plug support vanes 112. This inlet cone 138 holds the countered metering plug 114 as may be best seen in the cross-sectional illustration of FIG. 5 taken at a 45-degree angle to the metering plug support vanes 112. In embodiments that utilize a threaded interface between the inlet cone 138 and the countered metering plug 114, a tool boss 140 may be provided in the end of the countered metering plug 114, as may be seen in the outlet end view of FIG. 4. Such tool boss 140 allows assembly by rotating the countered metering plug 114 such that its threaded fixation member 142 may be secured in a threaded receiver 144 of the inlet cone 138 as may be seen in FIG. 5. In other embodiments, fixation of the countered metering plug 114 and the inlet cone 138 may take other forms, e.g., interference fit, spin weld, adhesive, etc., and in still other embodiments the inlet cone 138 and the countered metering plug 114 may be integrally formed.

The contours of both the metering plug 114 and the diverging sleeve 116 can be created specifically for the required metering area as is known in the art. The plug 114 and diverging sleeve 116 materials can vary depending on the application, and are preferably selected from among steel, aluminum, Inconel, even plastic as required. As mentioned above, the plug 114 is designed to be removable in certain embodiments, thereby allowing for different plug 114 and diverging sleeve 116 combinations to fit into the same size of inlet/outlet housing 118/132. This feature also allows the plug to be manufactured with highly intricate profiles and surface finishes required for accurate metering and recovery performance, and allows for iterative changes to the metering area requirements as needed for particular machines.

Figure 6:
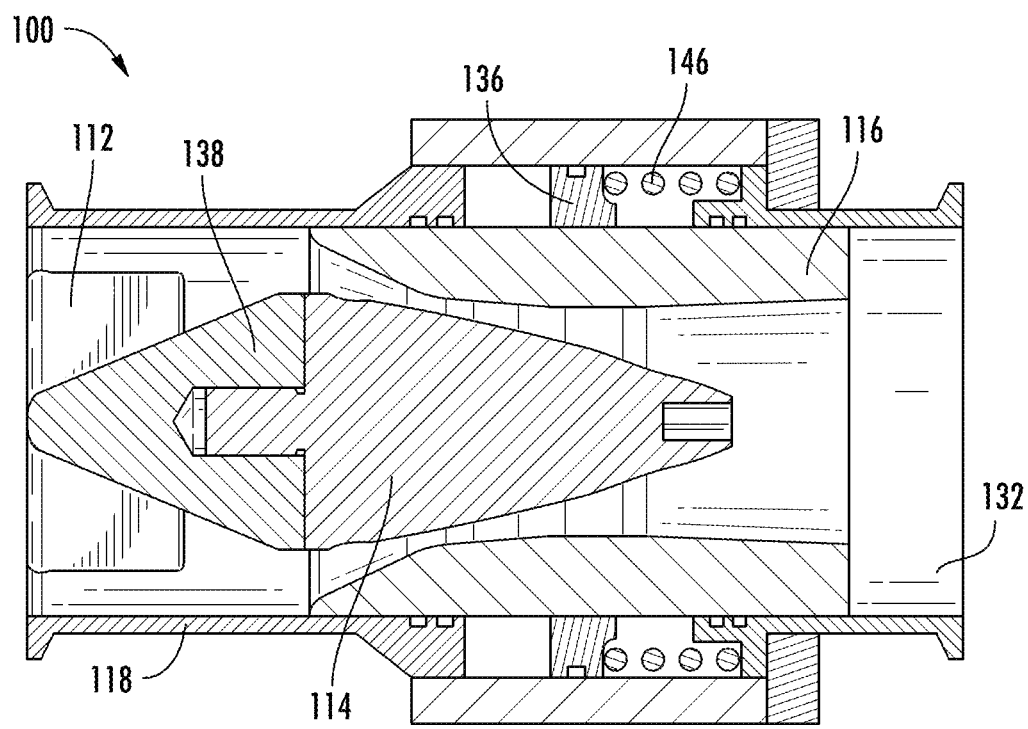
FIG. 6 is a cross-sectional view of an embodiment of a sonic gas valve constructed in accordance with the teachings of the present invention that utilizes a failsafe spring.

FIG. 6 shows schematically an embodiment that utilizes a failsafe and/or return spring 146. In such an embodiment, the inline sonic gas valve 100 is actuated with a 3-way servo valve (not shown), when single-acting would be an advantage. As will be recognized from the foregoing, however, such embodiments can still be activated in a dual-acting scheme. The moving diverging sleeve 116 is loaded to the fully closed position by the spring 146, e.g., a helical compression spring. This spring 146 has sufficient force to overcome the actuator following loss of power, trip, or position feedback signals to enable this failsafe operation.

High force levels ensure reliable operation with all common gaseous fuels and allow ANSI B16.104 Class IV shut-off to be achieved in embodiments that utilize metal seating between the plug 114 and the diverging sleeve 116. In other embodiments in which the operating environment requires greater than Class IV leakage performance, a soft seat utilizing, e.g., elastomers or plastics, may be integrated in either the plug 114 or diverging sleeve 116 contact areas (or both) to provide much tighter than Class IV leakage performance.

Furthermore, if actuation loads need to be reduced, the inlet flow pressure can be ported to the downstream side of the actuation piston (the control volume divider protrusion 136), via thru the diverging sleeve 116 thick section, in order to offset the inlet pressure's influence on the diverging sleeve 116 loading.

Figure 7:
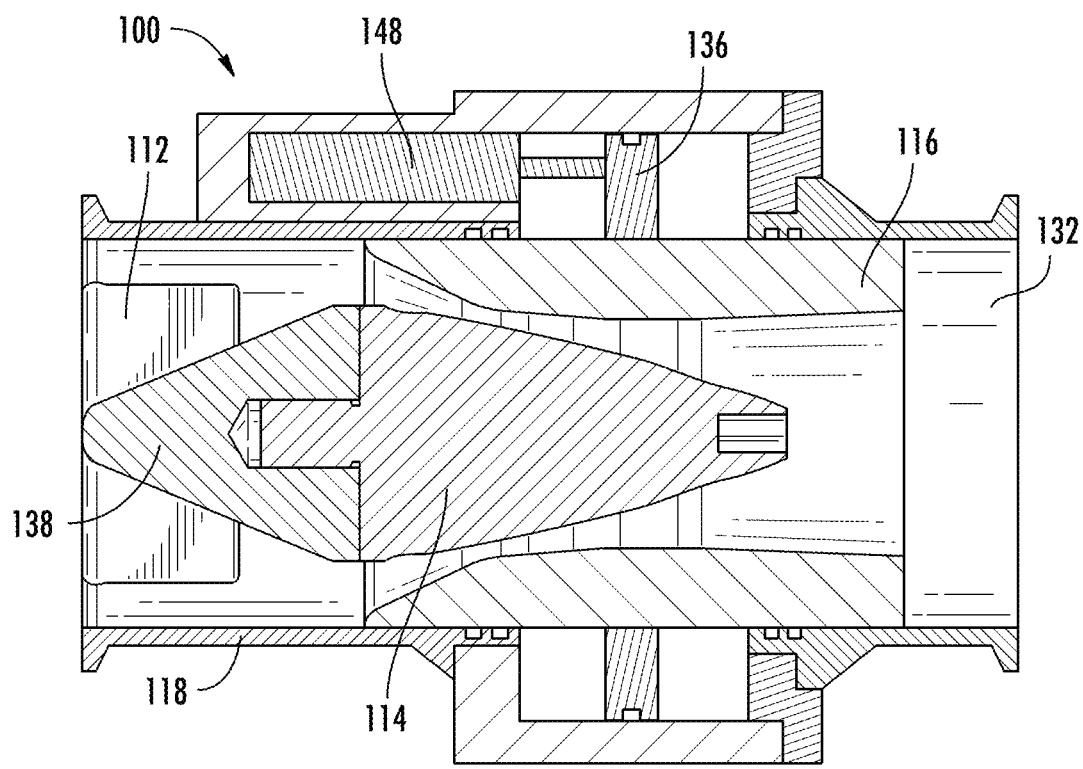
FIG. 7 is a cross-sectional view of an embodiment of a sonic gas valve constructed in accordance with the teachings of the present invention that utilizes a variable displacement transformer (VDT) for position sensing.

In the embodiment illustrated in FIG. 7, a variable displacement transformer (VDT) 148 is included to sense the position of the diverging sleeve 116. Such position sensing enables a fully modulating embodiment wherein the positioning of the sleeve 116 can be precisely controlled by utilizing a closed-loop position controller (not shown), as opposed to the simple poppet style on/off control discussed above. In the illustrated embodiment the VDT 148 is a linear VDT that senses the position of the control volume divider protrusion 136 as it translates back and forth. However, a rotary position sensor may be implemented in other embodiments, utilizing a rack and pinion type mechanism or similar and orienting the rotary device 90 degrees to the axis of flow.

Figure 8:
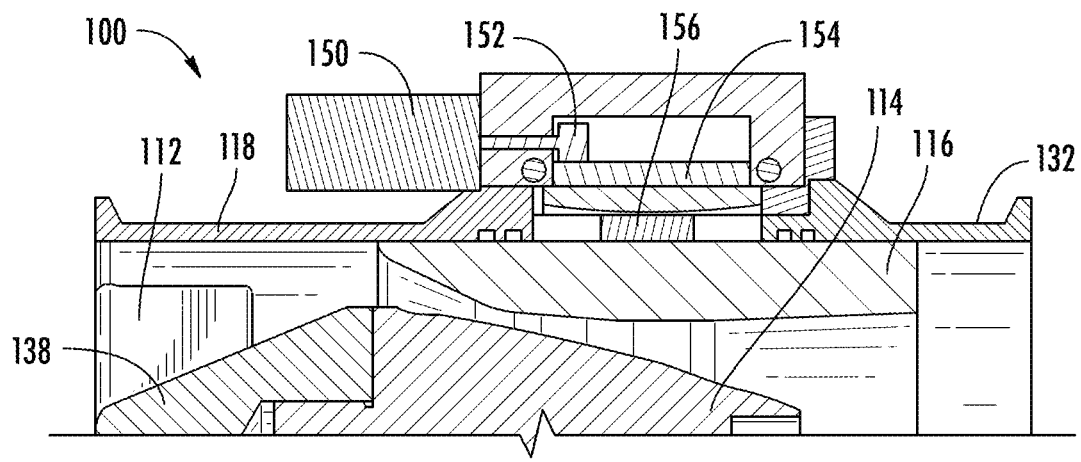
FIG. 8 is a partial cross-sectional view of an embodiment of a sonic gas valve constructed in accordance with the teachings of the present invention that utilizes an electric motor actuator with a roller/ball screw mechanism.

In the embodiment of FIG. 8, the diverging sleeve 116 positioning is controlled by an electric motor 150 driving a gear 152. In such an embodiment the diverging sleeve 116 becomes the screw (via threads 156) of a roller or ball screw mechanism 154. The electric motor 150 turns the outer shell of the "nut" of the roller or ball screw mechanism 154 in order to create the linear motion of the diverging sleeve 116 based on an electromechanical actuator (EMA) input. As is known, this requires that the diverging sleeve 116 have an anti-rotation mechanism in order to translate the rotary motion of the "nut" of the roller or ball screw mechanism 154 into linear motion of the sleeve 116.

Figure 9:
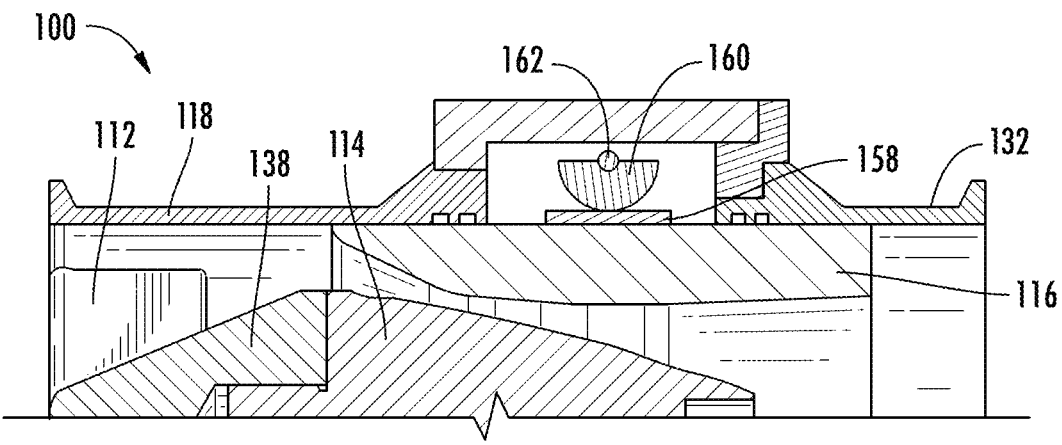
FIG. 9 is a partial cross-sectional view of an embodiment of a sonic gas valve constructed in accordance with the teachings of the present invention that utilizes an electric motor actuator with a rack and pinion mechanism.

FIG. 9 illustrates an alternative EMA embodiment utilizing a rack 158 formed or mounted onto the sleeve 116 and a pinion 160 (round or sector as shown) driven directly by the motor shaft 162 or via a gear reduction train that would be turned by the electric motor (not shown). In such an embodiment, this motor is mounted 90 degrees compared to the embodiment of FIG. 8. Such embodiment also allows the use of a rotary variable differential transformer (RVDT) position feedback device (not shown) for position feedback on the opposite side of the motor shaft.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An inline variable sonic valve, comprising:
   a housing defining an inlet and an outlet positioned inline along a gas flow axis;
   a contoured metering plug fixed within the housing;
   a diverging sleeve movably positioned within the housing downstream of the contoured metering plug; and
   an actuator positioned offline from the gas flow axis configured to move the diverging sleeve within the housing relative to the contoured metering plug fixed therein to vary a gas metering area defined between the contoured metering plug and the diverging sleeve;
   wherein the diverging sleeve is shaped such that an area gradient starts out as a small positive value downstream of the gas metering area and increases along a length of the diverging sleeve to a maximum value to provide sonic gas flow for discharge pressure up to a pressure ratio of output pressure to input pressure (P2/P1) of at least 0.80.

2. The inline variable sonic valve of claim 1, wherein the housing comprises an inlet housing and an outlet housing joined therewith, and wherein the inlet housing comprises a plurality of metering plug support vanes configured to hold the contoured metering plug in a fixed position within the inlet housing.

3. The inline variable sonic valve of claim 2, wherein the metering plug support vanes are integrated with an inlet cone configured to receive the contoured metering plug.

4. The inline variable sonic valve of claim 3, wherein the inlet cone is configured to threadably receive the contoured metering plug.

5. The inline variable sonic valve of claim 4, wherein the contoured metering plug defines a tool boss in an end thereof to facilitate threading of the contoured metering plug into the inlet cone.

6. The inline variable sonic valve of claim 1, wherein the actuator is configured to move the diverging sleeve relative to the contoured metering plug to vary a gas metering area between a fully closed position wherein the contoured metering plug and the diverging sleeve are in sealing contact to prevent any gas flow therebetween and a fully opened positioned wherein the contoured metering plug and the diverging sleeve are spaced apart to allow gas flow therebetween.

7. An inline variable sonic valve, comprising:
a housing defining an inlet and an outlet positioned inline along a gas flow axis;
a contoured metering plug fixed within the housing;
a diverging sleeve movably positioned within the housing downstream of the contoured metering plug; and
an actuator positioned offline from the gas flow axis configured to move the diverging sleeve within the housing relative to the contoured metering plug fixed therein to vary a gas metering area defined between the contoured metering plug and the diverging sleeve;
wherein the actuator is configured to move the diverging sleeve relative to the contoured metering plug to vary a gas metering area between a fully closed position wherein the contoured metering plug and the diverging sleeve are in sealing contact to prevent any gas flow therebetween and a fully opened positioned wherein the contoured metering plug and the diverging sleeve are spaced apart to allow gas flow therebetween; and
wherein the actuator is a poppet-style actuator configured to position the diverging sleeve in one of the fully closed position or the fully opened position discretely.

8. The inline variable sonic valve of claim 6, wherein the actuator includes a first fitting fluidly coupled to a first actuation control volume and a second fitting fluidly coupled to a second actuation control volume, the first actuation control volume and the second actuation control volume each being defined between the housing and an outer periphery of the diverging sleeve, the first actuation control volume and the second actuation control volume being separated by a control volume divider protrusion extending from the diverging sleeve such that a differential pressure between the first actuation control volume and the second actuation control volume results in movement of the diverging sleeve within the housing.

9. The inline variable sonic valve of claim 8, wherein the first fitting and the second fitting are one of hydraulic fittings, fueldraulic fittings, or pneumatic fittings.

10. An inline variable sonic valve, comprising:
a housing defining an inlet and an outlet positioned inline along a gas flow axis;
a contoured metering plug fixed within the housing;
a diverging sleeve movably positioned within the housing downstream of the contoured metering plug; and
an actuator positioned offline from the gas flow axis configured to move the diverging sleeve within the housing relative to the contoured metering plug fixed therein to vary a gas metering area defined between the contoured metering plug and the diverging sleeve;
wherein the actuator is configured to move the diverging sleeve relative to the contoured metering plug to vary a gas metering area between a fully closed position wherein the contoured metering plug and the diverging sleeve are in sealing contact to prevent any gas flow therebetween and a fully opened positioned wherein the contoured metering plug and the diverging sleeve are spaced apart to allow gas flow therebetween;
wherein the actuator includes a first fitting fluidly coupled to a first actuation control volume and a second fitting fluidly coupled to a second actuation control volume, the first actuation control volume and the second actuation control volume each being defined between the housing and an outer periphery of the diverging sleeve, the first actuation control volume and the second actuation control volume being separated by a control volume divider protrusion extending from the diverging sleeve such that a differential pressure between the first actuation control volume and the second actuation control volume results in movement of the diverging sleeve within the housing; and
wherein the diverging sleeve includes a port fluidly coupling an inlet flow pressure to a downstream side of the control volume divider protrusion in order to offset influence of the inlet flow pressure on the diverging sleeve to reduce actuation differential pressure.

11. The inline variable sonic valve of claim 6, wherein the actuator includes a position sensor configured to determine a position of the diverging sleeve within the housing, the actuator being configured to position the diverging sleeve in a selected position between the fully closed position and the fully opened position to vary the gas flow.

12. The inline variable sonic valve of claim 11, wherein the position sensor is a linear variable differential transformer.

13. The inline variable sonic valve of claim 6, wherein the actuator includes a failsafe spring configured to return the diverging sleeve to one of the fully closed position or the fully opened position.

14. The inline variable sonic valve of claim 6, wherein the actuator comprises an electric motor drivably coupled to the diverging sleeve.

15. The inline variable sonic valve of claim 14, wherein the electric motor drives roller or ball screw element threadably connected to threads on an exterior surface of the diverging sleeve to linearly translate the diverging sleeve within the housing.

16. The inline variable sonic valve of claim 15, further comprising a rotary variable differential transformer (RDVT) to determine a position of the diverging sleeve within the housing.

17. The inline variable sonic valve of claim 14, wherein the electric motor drives a pinion threadably connected to a rack positioned on an exterior surface of the diverging sleeve to linearly translate the diverging sleeve within the housing.

18. The inline variable sonic valve of claim 1, wherein the diverging sleeve is shaped to provide sonic gas flow for discharge pressure up to the pressure ratio P2/P1 of at least 0.91.

19. The inline variable sonic valve of claim 1, wherein the diverging sleeve is further shaped to provide a converging contoured restriction such that the area gradient starts at approximately zero and becomes increasingly negative closer to the gas metering area.

20. An inline variable sonic valve, comprising:
a housing defining an inlet and an outlet positioned inline along a gas flow axis;
a contoured metering plug fixed within the housing;
a sleeve movably positioned within the housing; and
an actuator positioned offline from the gas flow axis configured to move the sleeve relative to the contoured metering plug fixed therein to vary a gas metering area defined between the contoured metering plug and the sleeve; and wherein the sleeve is shaped such that an area gradient of an inlet of the sleeve has a small increasingly negative value upstream of and approaching the gas metering area and immediately downstream of the gas metering area has an increasingly positive value along a length of the sleeve.

\* \* \* \* \*